United States Patent [19]

Fujita et al.

[11] Patent Number: 4,685,690
[45] Date of Patent: Aug. 11, 1987

[54] SUSPENSION APPARATUS OF VEHICLE

[75] Inventors: Haruyasu Fujita, Tokyo; Masao Ogawa, Shiki; Takahisa Suzuki, Omiya, all of Japan

[73] Assignee: Honda Giken Kogyo Kabushiki Kaisha, Tokyo, Japan

[21] Appl. No.: 806,914

[22] Filed: Dec. 9, 1985

[30] Foreign Application Priority Data

| Dec. 26, 1984 | [JP] | Japan | 59-272777 |
| Feb. 25, 1985 | [JP] | Japan | 60-34629 |
| Feb. 25, 1985 | [JP] | Japan | 60-34630 |
| Feb. 25, 1985 | [JP] | Japan | 60-34631 |
| Apr. 5, 1985 | [JP] | Japan | 60-70785 |

[51] Int. Cl.$^4$ .................. B62D 9/02; B60G 21/00
[52] U.S. Cl. .................. 280/112 A; 280/692; 280/772
[58] Field of Search ............ 280/709, 702, 711, 688, 280/112 A, 772, 707, 692

[56] References Cited

U.S. PATENT DOCUMENTS

| 782,954 | 2/1905 | Elliott | 137/625.44 |
| 1,084,740 | 1/1914 | Holzwarth | 137/625.23 |
| 2,247,749 | 7/1941 | De Venel | 280/707 |
| 2,650,108 | 8/1953 | Bruce | 280/692 |
| 2,905,430 | 9/1959 | Deist | 251/54 |
| 2,996,309 | 8/1961 | Nallinger | 280/112 R |
| 3,129,644 | 4/1964 | Anderson | 91/413 |
| 3,207,254 | 9/1965 | Venel | 280/702 |
| 3,222,867 | 12/1965 | Gauldie | 60/54.5 |
| 3,589,933 | 1/1971 | Pitcher | 280/702 |
| 3,752,497 | 8/1973 | Enke | 280/702 |
| 3,820,809 | 6/1974 | Blonar | 280/91 |
| 3,820,812 | 6/1974 | Stubbs et al. | 280/112 A |
| 4,345,661 | 8/1982 | Nishikawa | 280/772 |

FOREIGN PATENT DOCUMENTS 2097730 11/1982 United Kingdom .

Primary Examiner—Richard A. Bertsch
Attorney, Agent, or Firm—Armstrong, Nikaido, Marmelstein & Kubovcik

[57] ABSTRACT

A suspension spring is provided with a telescopic member comprising a cylinder and a piston, and fluid pressurized by a pump is controlled by a control valve, and fed to the telescopic member or discharged therefrom. Due to the foregoing, the total length of the suspension springs is varied. Since the control valve is in association with a steering mechanism, either one of the pair of right and left suspension springs is expanded according to steering operation, while the other suspension spring is contracted. As a result, a vehicle body is inclined toward the turning center side. The inside of the cylinder may be defined into two upper and lower cylinder chambers by the piston, so that when fluid is fed to one of the cylinder chambers, the fluid is simultaneously discharged from the other cylinder chamber. The control valve is a rotary valve formed of an inner valve and an outer valve. Such rotary valves may be mounted on the respective suspension springs. Otherwise, the stream of the fluid may be switched by only one rotary valve to expand or contract the respective suspension springs.

3 Claims, 24 Drawing Figures

SUSPENSION APPARATUS OF VEHICLE

BACKGROUND OF THE INVENTION

This invention relates to a vehicle which is equipped with at least one unit of a pair of right and left wheels such as an automobile and a motor tricycle.

In a vehicle having a pair of right and left wheels as set forth above, a vehicle body tends to incline outwardly, i.e., toward the opposite direction with respect to a turning center of the vehicle due to the centrifugal force during turning. On the other hand, in a two-wheel vehicle, it effects a turn by inclining its body inwardly, i.e., in a lean state. The present invention intends to provide a device for causing a vehicle body or vehicle wheels to incline toward the turning center side during turning, so that a driver can enjoy a similar steering sense as that of a two-wheel vehicle in an automobile or motor tricycle.

A motor tricycle which can be inclined toward the turning center side of a vehicle body during turning is described in, for example, Japanese Laid-open Patent Publication (Kokai Tokkyo Koho) No. 54-25033. This motor tricycle has two right and left front wheels and one rear wheel, and it is constructed as such that its body is inclined toward the turning center side during turning by shifting the weight of a driver toward the turning center side resisting the centrifugal force. Since this motor tricycle is of a saddle type as a usual motorcycle is, it is comparatively easy for the driver to shift his weight to incline the vehicle body. However, when a driver's seat is of a seat type as a usual automobile, it is not necessarily an easy job for him to incline the vehicle body merely by shifting his weight.

SUMMARY OF THE INVENTION

It is therefore an object of the present invention to provide a suspension apparatus of a vehicle, wherein a vehicle body is automatically inclined toward the turning center side by means of steering operation, even if a driver does not intendedly shift his weight during turning irrespective of whether the vehicle is of the aforementioned saddle type or seat type.

Another object of the present invention is to provide a suspension apparatus of a vehicle, wherein a vehicle body is automatically inclined toward the turning center side according to expansion and contraction of a suspension spring caused by fluid pressure according to steering operation.

A further object of the present invention is to provide a novel control valve for controlling fluid which is fed to and discharged from the suspension spring.

According to the present invention, a suspension spring is provided with a telescopic member which is expanded and contracted by fluid pressure, the telescopic member being fed to or discharged therefrom the pressurized fluid through a control valve operatively connected to a steering mechanism. Due to the foregoing, the total length of the suspension spring is varied depending on steering quantity. As a result, a vehicle body is inclined.

The above and other objects and features will become more manifest from the following description with reference to the accompanying drawings.

DESCRIPTION OF THE PREFERRED EMBODIMENTS

An illustrated embodiment of the present invention wherein the present invention is applied to a motor tricyle having two front wheels and one rear wheel will be described hereunder.

Figure 1:
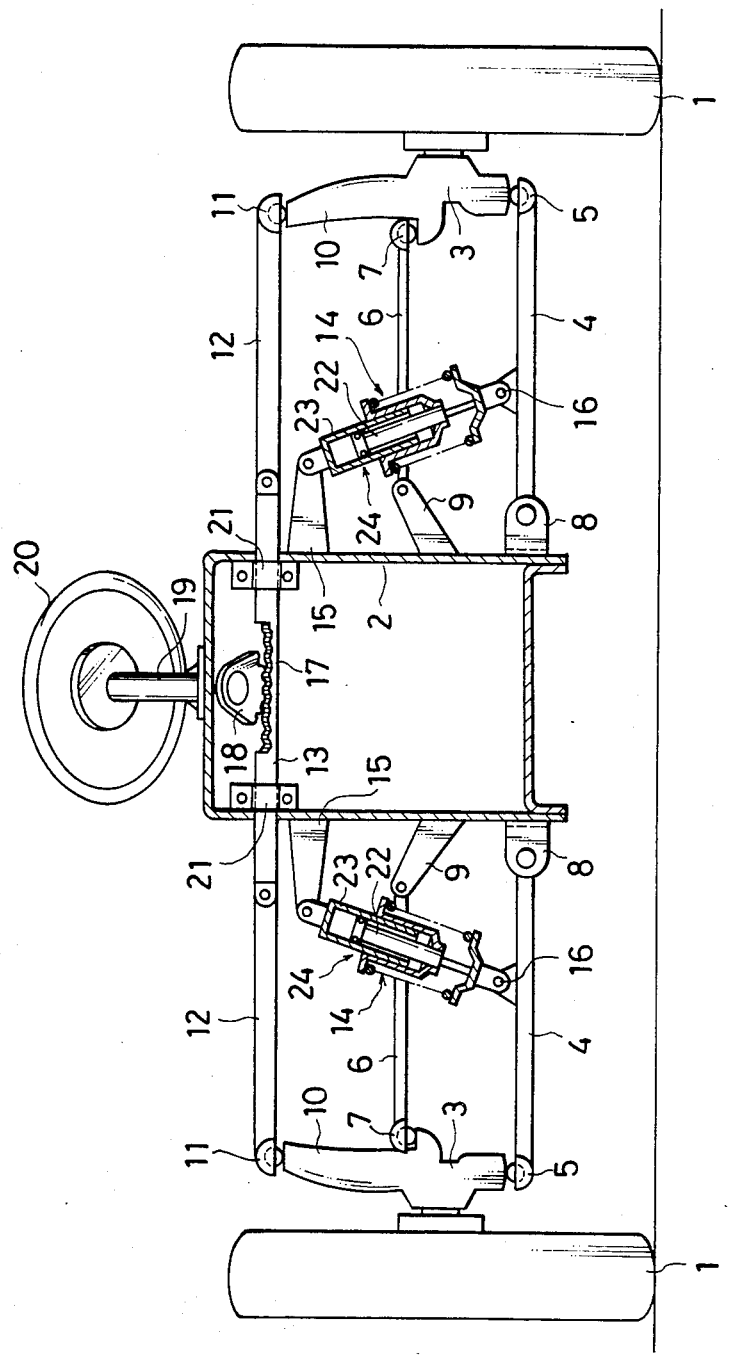
FIGS. 1 and 2 are front views of a suspension apparatus according to the present invention when viewed from the front at a time when a vehicle runs straight forward and effects a turn respectively, wherein a hydraulic system is omitted from the drawings.
Figure 2:
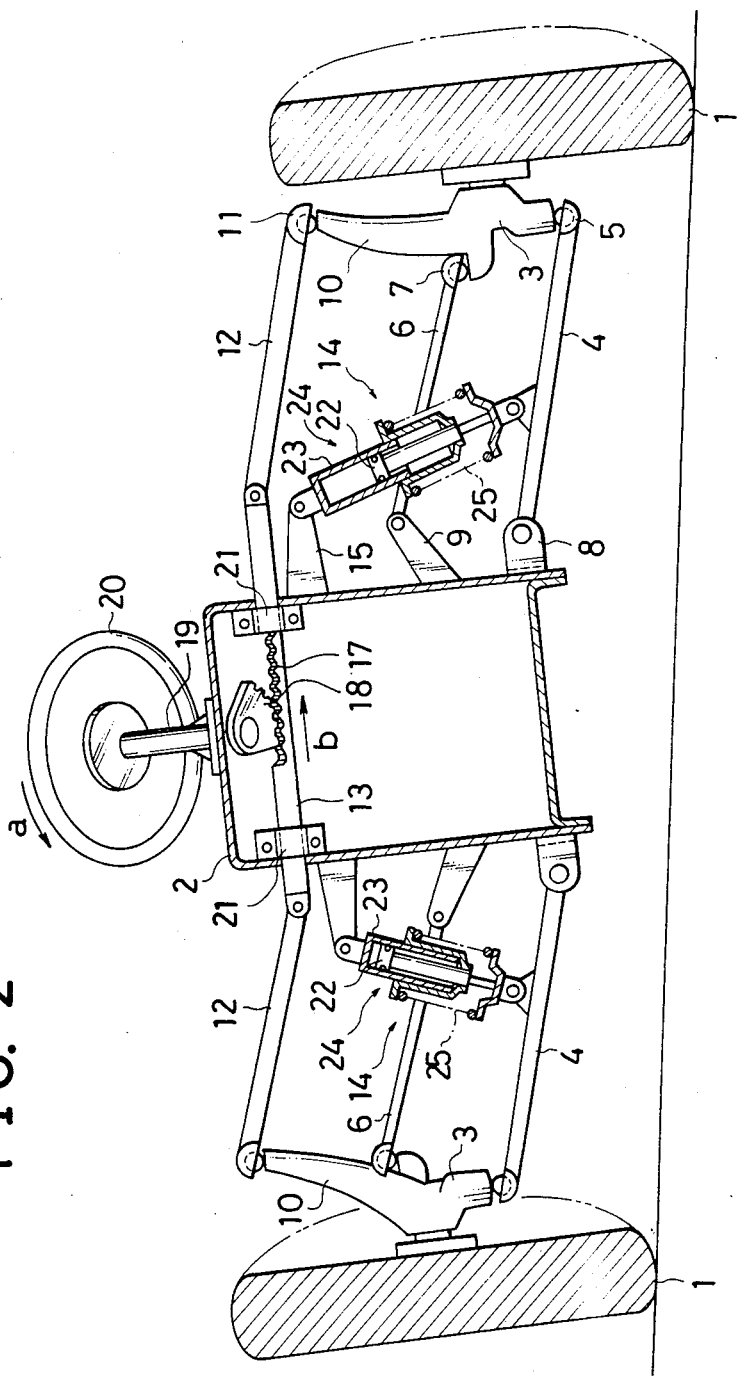

FIG. 1 is a front view of a suspension apparatus when viewed from the front at a time when a vehicle runs straight forward, and FIG. 2 is likewise a front view thereof but illustrating when the vehicle is turning to the right, wherein a hydraulic system is omitted and the figures are somewhat simplified for easier understanding. It is noted that the terms "right" or "left" when used in the following description means the right or the left when viewed from a driver. 1 denotes front wheels and 2 denotes a vehicle body. The right and left front wheels 1, 1 are each provided with a knuckle 3 integrated with an axle. Connected to a lower end portion of each of the knuckles 3 through a ball joint 5 is a lower arm 4. An upper portion of the knuckle 3 is connected with an upper arm 6 through a ball joint 7. The other end of the lower arm 4 is pivotally attached to the vehicle body 2 through a bracket 8. While, the other end of the upper arm 6 is pivotally attached to the vehicle body 2 through a bracket 9, thus constituting the so-called wishbone type suspension.

The knuckle 3 is provided with a knuckle arm 10 projecting backwardly at angles therefrom. The knuckle arm 10 is connected with a tie rod 12 through a ball joint 11 at one end. The other end of the tie rod 12 is pivotally attached to one end portion of a steering member or slide shaft 13 which reciprocally moves rightwardly and leftwardly. The slide shaft 13 is sidably supported by the vehicle body 2 through a bearing 21. The slide shaft 13 is provided at its central portion with a rack 17. The rack 17 is meshed with a pinion 18 provided on a steering shaft 19. 20 denotes a steering wheel.

Right and left suspension springs 14, 14 are respectively provided at the upper portions thereof with a telescopic member 24 comprising a piston 22 and a cylinder 23 actuated by hydraulic power. An upper end of the telescopic member 24 is pivotally attached to the vehicle body 2 through a bracket 15. A lower end of the suspension spring 14 is mounted to an intermediate portion of the lower arm 4 through a pivot 16.

Figure 3:
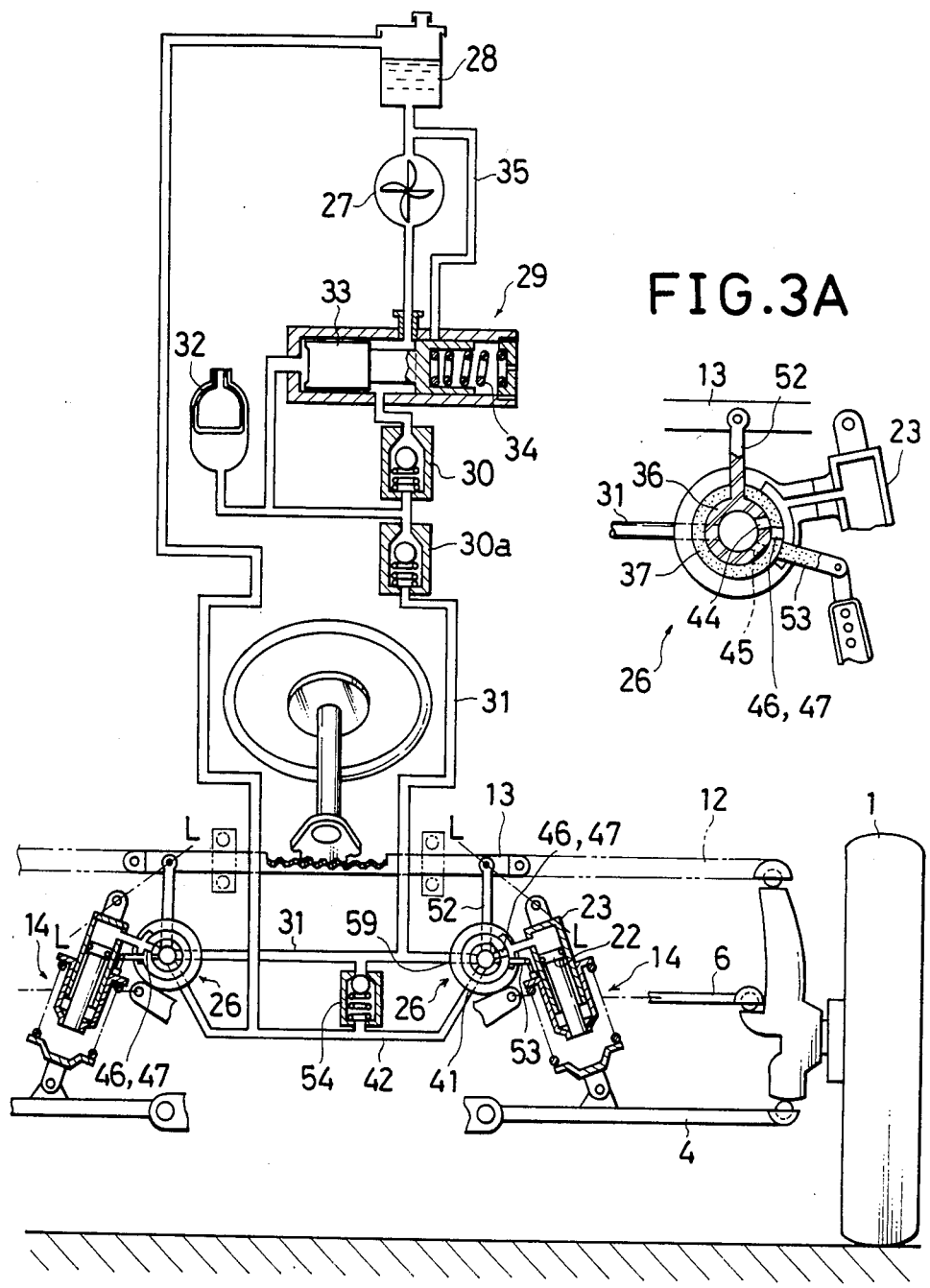
FIG. 3 is an illustration of a hydraulic system when a vehicle runs straight forward.

When a vehicle runs straight forward, the pinion 18 is meshed with the rack 17 at its central portion as shown in FIG. 1. However, when the vehicle turns to the right for example, a steering wheel 20 is pivoted counter clockwise as shown by an arrow a in FIG. 2. The pivotal movement of the pinion 18 causes the slide shaft 13 to slide to the left as shown by an arrow b to turn the front wheels 1 to the right. At this time, as shown in FIG. 3 and others having larger figure numbers, and will be described in detail later, the cylinder 23 of the left side (the right side in the figures) suspension spring 14 is fed with a pressure oil. While an actuation oil is discharged from the cylinder 23 of the right side suspension spring 14. Since a coil spring 25 of the suspension spring 14 has a high rigidity and is practically hardly expanded, the left side cylinder 23 is moved upwardly (that is, the telescopic member 24 is expanded) by the pressure oil acted between the piston 22 and itself to expand the total length of the suspension spring 14. On the other hand, the right side suspension spring 14 is contracted the total length thereof, since the cylinder 23 is moved downwardly, that is, the telescopic member 24 is contracted.

As a result, the left side suspension spring 14 pushes down the lower arm 4 relative to the vehicle body 2, and the right side suspension spring 14 pulls up the right side lower arm 4 relative to the vehicle body 2. At this time, the respective upper arms 6 follow the movements of the respective lower arms 4. However, since the front wheels 1 are always contracted with the ground, the afore-mentioned movements of the respective members finally cause the vehicle body 2 to inclined (the front wheels 1 are also inclined in accordance with the movements) to the right, that is, to the turning direction as shown in FIG. 2. As a result, the vehicle effects a turn in a lean state same as in the case of a motorcycle. Although a right turn is described in the foregoing, a left turn is effected in the same manner.

FIG. 3 illustrates a hydraulic system for feeding the actuation oil to the cylinder 23 and discharging the same therefrom as described above when the vehicle effects a turn. The feeding and the discharging of the actuation oil to and from the cylinder 23 are controlled by a control valve or rotary valve 26 which is rotated in response to the slide shaft 13. The rotary valve 26 is fed with the actuation oil pressurized by a pump 27. The pump 27 is driven by an engine of the vehicle. When the engine is actuated, an actuation oil within a reservoir tank 28 is fed into a feed pipe 31 by the pump 27 via a cut-off valve 29 and a one-way valve 30 and reaches the rotary valve 26. At the same time, a part of the actuation oil is fed into an accummulator 32 and accummulated therein under pressure. When pressure within the feed pipe 31 reaches a specified value, a piston 33 of the cut-off valve 29 is moved to the right in the figure resisting the spring 34 to cut off the feed pipe 31 from the pump 27 and at the same time, to circulate a discharge oil from the pump 27 to an intake side thereof through a by-pass pipe 35. A one-way valve 30a provided to the feed pipe 31 prevents pressure produced at the suspension side from escaping to the accummulator 32.

Figure 4:
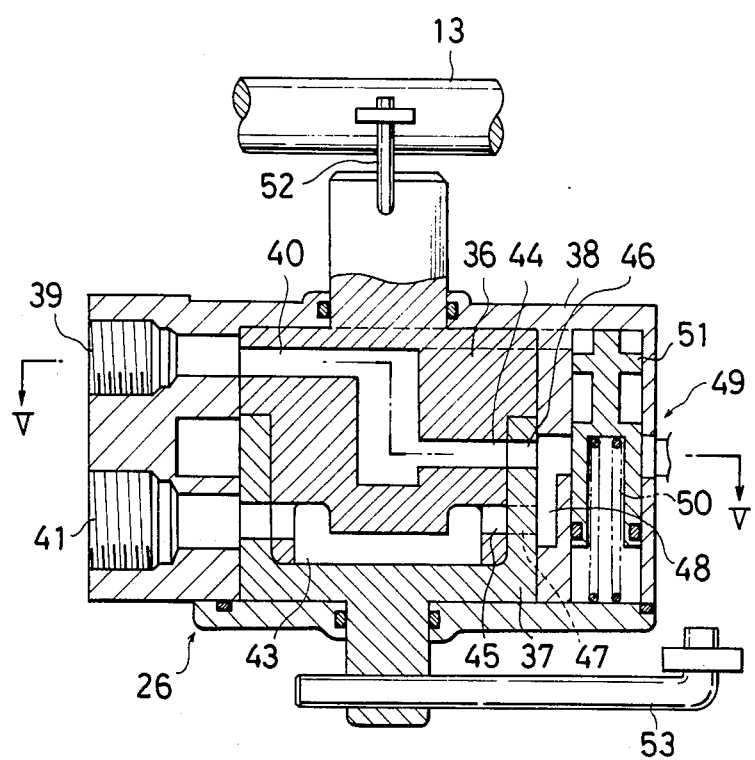
FIG. 4 is a horizontal sectional view of the control valve.
Figure 5:
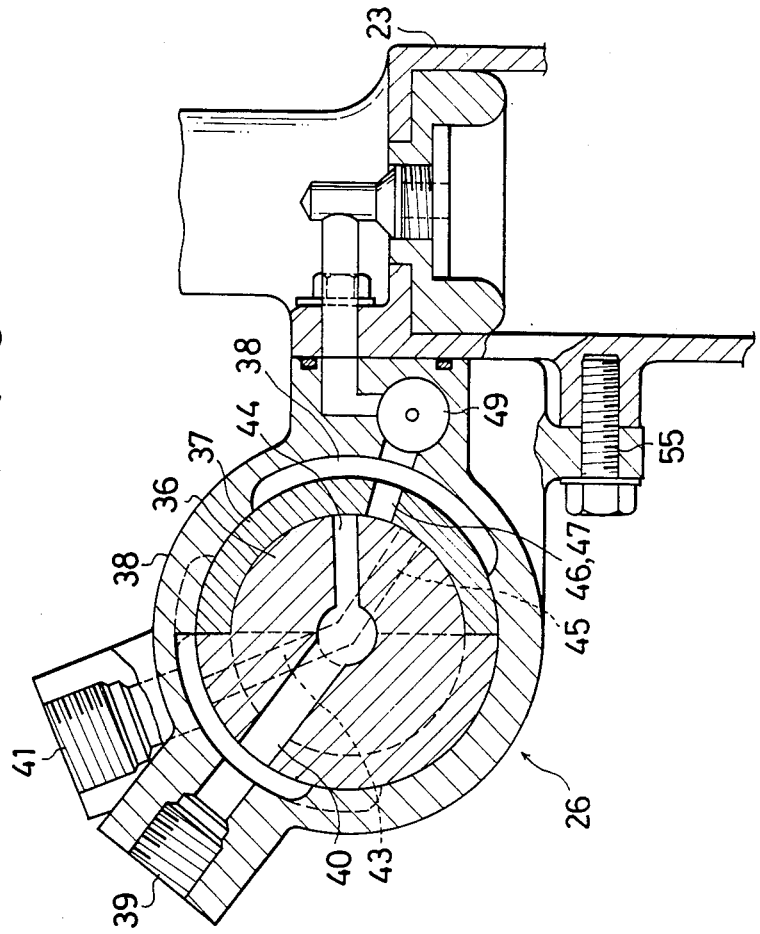
FIG. 5 is a sectional view taken on line V—V of FIG. 4.

The rotary valve 26 comprises, as shown in FIGS. 4 and 5, a column-shaped valve, i.e. an inner valve 36, a cylinder-shaped outer valve 37 contacted to the outer peripheral surface of the inner valve 26 and relatively pivotably fitted thereto, and a housing or main body 38 for pivotably accommodating and supporting them. The inner valve 36 is provided with an oil feed path 40 communicating with the feed pipe 31 through an inlet port 39, and an oil discharge path 43 communicating with a return pipe 42 (see FIG. 3) through an outlet port 41. And, these oil feed pipe 40 and oil discharge pipe 43 respectively communicate with an oil feed port 44 and an oil discharge port 45 which are opened up in the peripheral surface of the inner valve 36 by being mutually displaced in the peripheral direction and axial direction as apparent from FIGS. 4 and 5.

The outer valve 37 is provided with an oil feed hole 46 and an oil discharge hole 47 in positions in alignment with the oil feed port 44 and the oil discharge port 45 in the axial direction, respectively. These holes 46 and 47 are provided on a same generating line. In other words, they are arranged on a plane including the rotary axis of the outer valve 37. The main body 38 is provided with an oil path 48 confronting with the oil feed hole 46 and oil discharge hole 47. The oil path 48 communicates with the cylinder 23 of the telescopic member 24 through a cut-off valve 49.

The cut-off valve 49 includes a piston 51 energized by a spring 50. When an engine is stopped and no oil pressure remains in the oil feed pipe 31, the cut-off valve 49 cuts off the oil path 48 from the cylinder 23, as shown in FIG. 4, in order to prevent oil to escape from the cylinder 23 so that the vehicle body 2 will not sink. When the engine is actuated and an oil pressure is produced in the feed pipe 31, the piston 51 compresses a spring 50 for displacement by the oil pressure and causes the oil path 48 to communicate with the cylinder 23.

The rotary valve 26 is fixed to the cylinder 23 by a bolt 55 as shown in FIG. 5. The inner valve 36 is pivotably connected to the slide shaft 13 through a swingable piece 52, and pivoted in response to reciprocal movement of the slide shaft 13. The outer valve 37 is connected with the piston 22 side of the telescopic member 24 through a lever piece 53 and pivoted relative to the inner valve 36 in response to movement of the piston 22 for effecting a feed-back action.

Figure 3A:
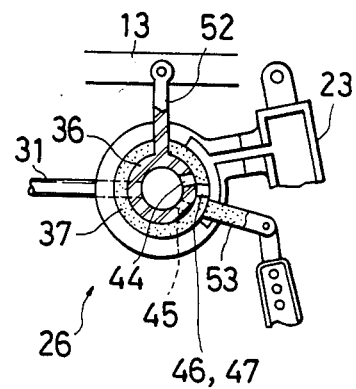
FIG. 3A is a more clear illustration of the control valve of FIG. 3.

The return pipe 42 connected to the outlet port 41 of the rotary valve 26 is, as shown in FIG. 3, connected to the reservoir tank 28. Between the feed pipe 31 and the return pipe 42, a safety valve 54 is disposed in order to escape oil within the feed pipe 31 to the reservoir tank 28. FIG. 3 illustrates a state, similar to FIG. 1, when the vehicle runs straight forward. The rotary valve 26 is, as shown in FIG. 3A, in its neutral state, wherein the oil feed hole 46 and oil discharge hole 47 of the outer valve 37 are located at an intermediate position in the peripheral direction between the oil feed port 44 and oil discharge port 45 of the inner valve 36. The afore-mentioned FIG. 5 shows the similar neutral state, too.

Figure 8:
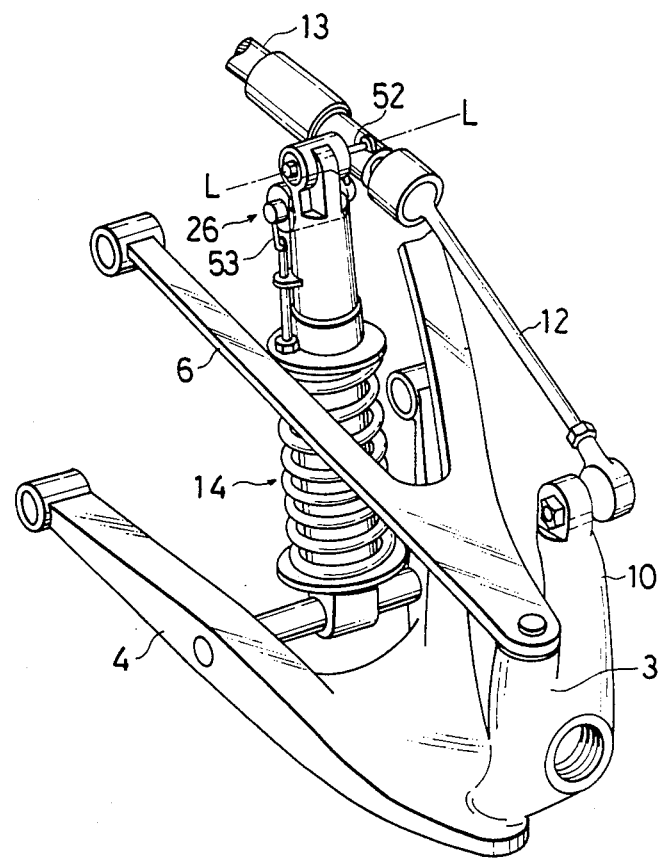
FIG. 8 is a partial perspective view showing a concrete constitution of the suspension apparatus.

It is noted that the pivot axis with respect to the slide shaft 13 of the swingable piece 52 and the pivot axis with respect to the vehicle body 2 of the suspension spring 14, i.e. the bracket 15 in FIG. 1, are in alignment with each other as shown by the axial line L—L in FIGS. 3 and 8, when the vehicle runs straight forward.

Figure 6:
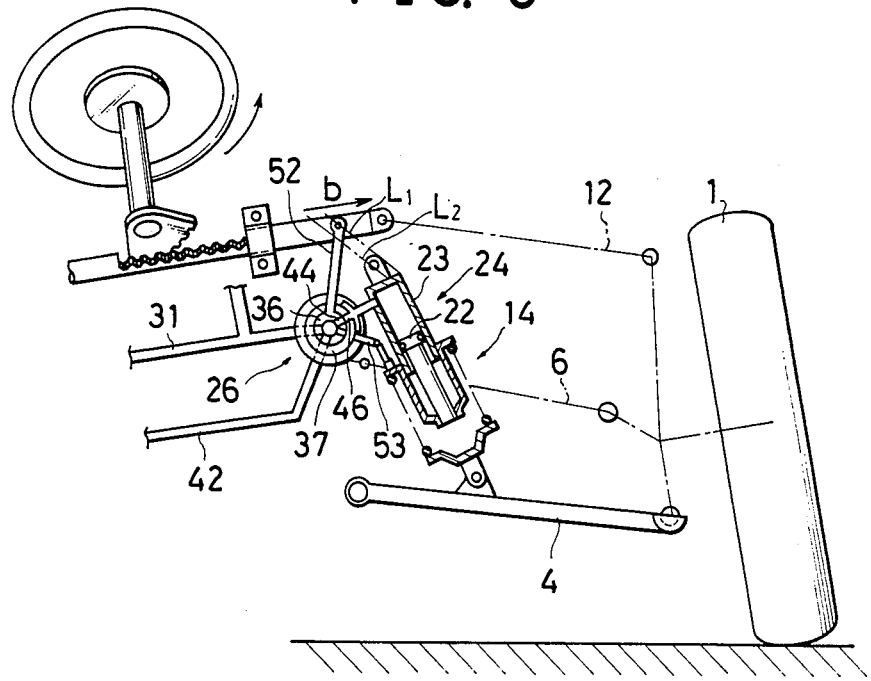
FIGS. 6 and 7 are illustrations showing a part of a suspension apparatus when a vehicle effects a turn.
Figure 6A:
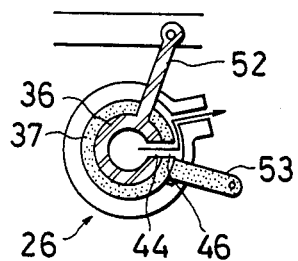
FIGS. 6A and 7A are more clear illustrations of the control valves of FIGS. 6A and 7A, respectively.
Figure 7:
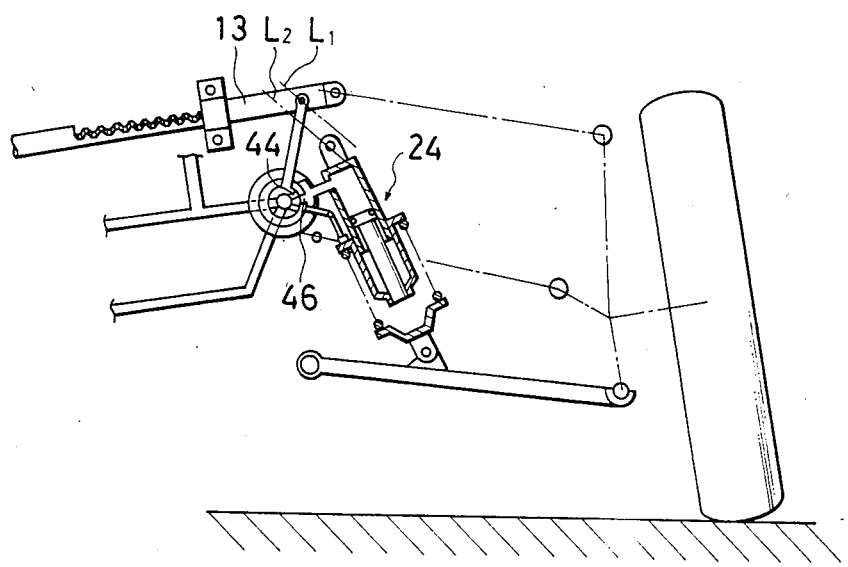
Figure 7A:
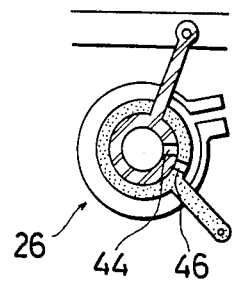

FIG. 6 illustrates the state of the left side (right side in the figure) suspension spring 14 and the rotary valve 26, when the vehicle turns to the right. When the vehicle effects a right turn, the slide shaft 13 moves to the left as shown by an arrow b, and the inner valve 36 connected to the slide shaft 13 through the swingable piece 52 pivots in the clockwise direction in the figure (at this time, the pivot axis L1 of the swingable piece 52 and the pivot axis L2 of the suspension spring 14 are slightly displaced but substantially on the same straight line). Accordingly, the oil feed port 44 which was separated away from the oil feed hole 46 is brought to be in conformity with the oil feed hole 46 (see FIG. 6A), and the oil pressure within the feed pipe 31 is fed to the cylinder 23 to push down the piston 22. According to the movement of the piston 22, the outer valve 37 connected to the piston 22 through the lever piece 53 is pivoted clockwise, and the oil feed hole 46 is separated from the oil feed port 44. However, since the oil feed port 44 is also pivoted clockwise while the slide shaft 13 is moving, the conforming state between the oil feed hole 46 and the oil feed port 44 can be maintained, and the piston 22 is kept moving. In other words, the telescopic member 24 is expanded and the total length of the suspension spring 14 is continuously increased. When the slide shaft 13 stops moving, the oil feed hole 46 is brought to be separated from the oil feed port 44 as shown in FIG. 7 (see FIG. 7A), and the telescopic member 24 stops expanding. As a result, the total length of the suspension spring 14 is maintained in the length corresponding to moving quantity or steering quantity of the slide shaft 13.

At the same time, in the right side rotary valve 26, the oil discharge port 45 is brought to be in conformity with the oil discharge hole 47, oil within the cylinder 23 is discharged to the return pipe 42 through the oil discharge path and the outlet port 41, and the telescopic member 24 is contracted. And, as in the same manner as already described, the total length of the suspension spring 14 is contracted to the length corresponding to the steering quantity and maintained in this length.

As a result, as described with reference to FIGS. 1 and 2, the vehicle body is inclined to the right, i.e. toward the turning direction side, and a lean state similar to a motorcycle is obtained.

In this embodiment, the suspension spring 14 is expanded and contracted according to the movement of the slide shaft 13. However, the slide shaft merely actuates the inner valve 36 of the rotary valve 26, and reaction force of the suspension spring 14 is not transmitted to the slide shaft 13. The slide shaft 13 is transmitted with only reaction force which the front wheels 1 receive from the ground by steering, and this reaction force is transmitted to the steering wheel. Thus, a satisfactory steering sense can be obtained.

Furthermore, as already described, since the pivot axis with respect to the slide shaft 13 (steering member) of the swingable piece 52 is substantially disposed on the extension of the pivot axis with respect to the vehicle body of the suspension spring 14, the following functions are obtained. That is, the suspension spring 14 is swung about the pivot axis with respect to the vehicle body according to up and down motion of the vehicle wheels 1 during running of the vehicle, especially when running on an uneven road. As a result, the rotary valve 26 fixed to the suspension spring 14 is also swung. However, since the pivot axis of the swingable piece 52 is substantially in alignment with the pivot axis of the suspension spring 14, the swinging of the rotary valve 26 together with the suspension spring 14 does not cause the inner valve 36 to pivot relative to the outer valve 37, and positional relation between the oil discharge ports 44 and 45, and the oil discharge holes 46 and 47 is held constant.

Figure 9:
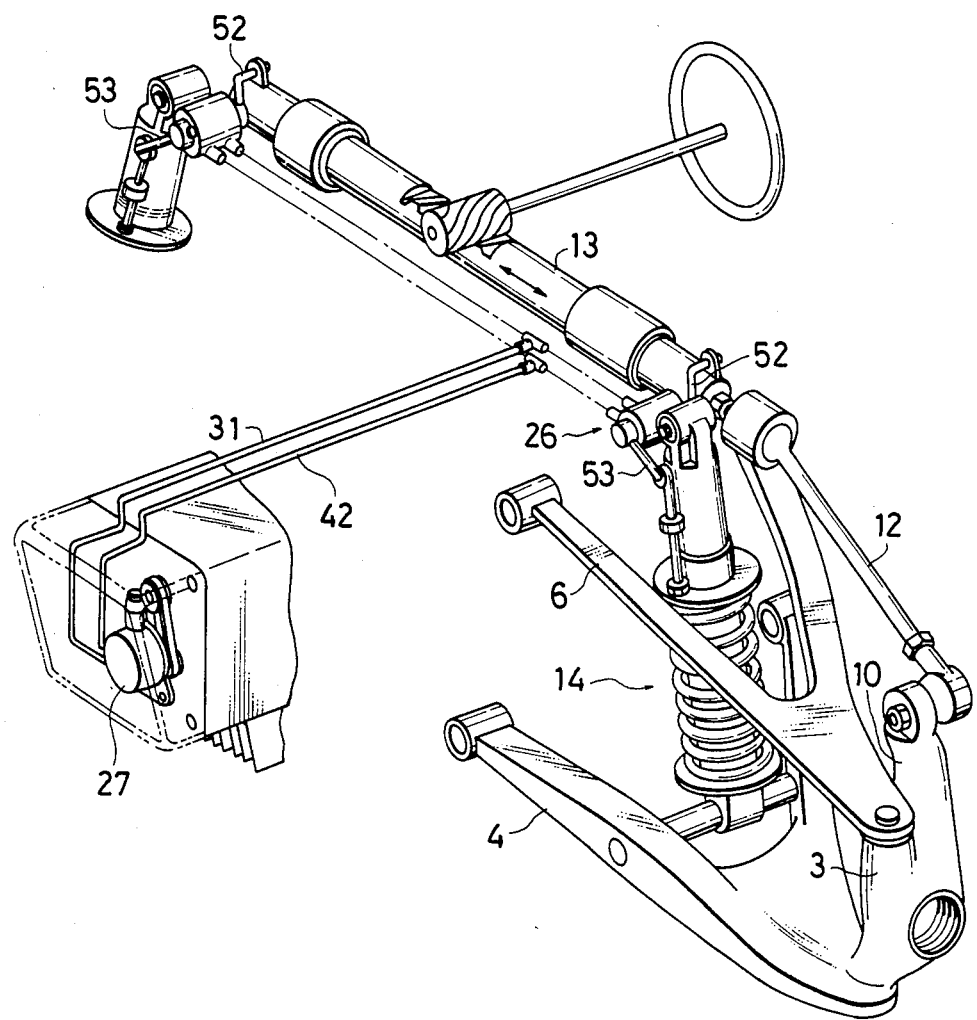
FIG. 9 is a perspective view showing a concrete constitution of a suspension apparatus according to another embodiment.

Actual constructions and arrangements of the above-mentioned various apparatuses are better comprehended when referred to FIGS. 8 and 9. However, in FIG. 9, the pivot axis with respect to the slide shaft 13 of the swingable piece 52 is not in alignment with the pivot axis with respect to the vehicle body of the suspension spring. In this respect, FIG. 9 belongs to another embodiment of the invention. The pump 27 and the reservoir tank 28 (not shown in FIG. 9) attached thereto is disposed at a lower position than the rotary valve 26. Thus, oil discharged from the rotary valve 26 is returned to the reservoir tank 28 via the return pipe 42 due to gravity. Accordingly, as shown in FIGS. 4 and 5, the outlet port 41 is formed larger in diameter than the inlet port 39, and the return pipe 42 is formed of a tubular material having a larger bore diameter relative to the feed pipe 31.

Figure 10:
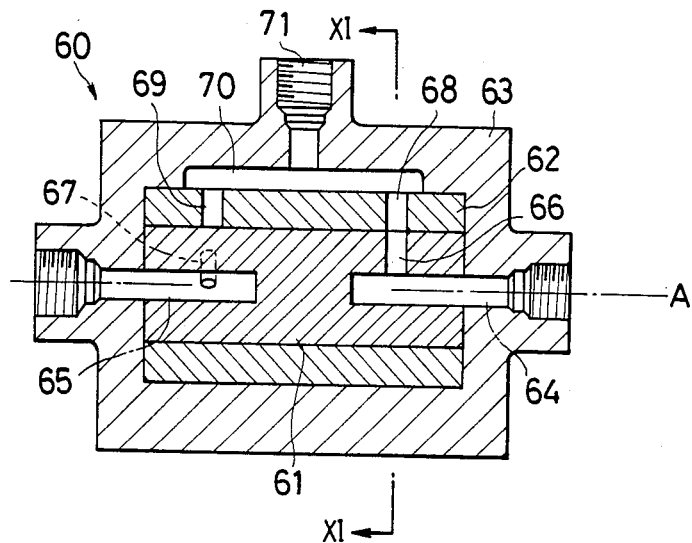
FIG. 10 is a sectional view in the axial direction showing a modified embodiment of the control valve.
Figure 11:
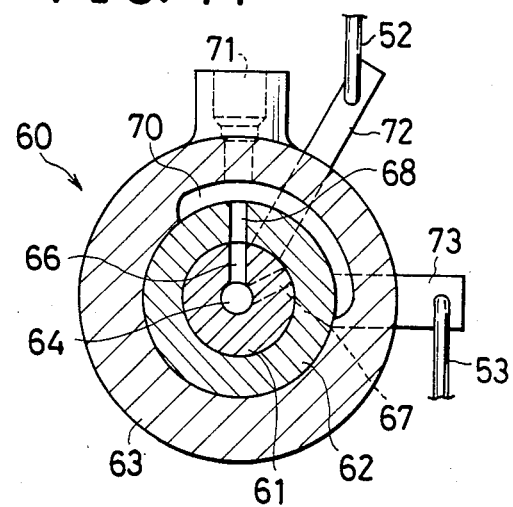
FIG. 11 is a sectional view taken on line XI—XI of FIG. 10.

FIGS. 10 and 11 illustrate a modified embodiment of the rotary valve 26 described above. This rotary valve 60 includes, as same as the rotary valve 26, inner and outer valves, i.e. an inner valve 61 and an outer valve 62, relatively rotatably fitted together about the same axis A, and a main body, i.e. a housing, for enclosing these valves 61 and 62. An oil feed path 64 communicating with the feed pipe 31 and an oil discharge path 65 communicating with the return pipe 42 are respectively disposed at both end portions of the inner valve 61 in such a manner as to be opposite with respect to each other in the axial direction. And, an oil feed port 66 communicating with the oil feed path 64 and an oil discharge port 67 communicating with the oil discharge path 65 are, as shown in FIG. 11, opened up in different angular positions on the outer peripheral surface of the inner valve 61. On the other hand, the outer valve 62 is provided with an oil feed port 68 and an oil discharge port 69 in corresponding positions in the axial direction with the oil feed port 66 and the oil discharge port 67, respectively. These oil feed and oil discharge ports 68 and 69 are arranged in a same plane including the axial line A. The oil feed port 68 and the oil discharge port 69 are communicated with each other by an oil path 70. The oil path 70 is communicated with the cylinder 23 of the telescopic member 24 through a connecting port 71.

An arm piece 72 extends from the inner valve 61 in the radial direction penetrating the outer valve 62 and the housing 63. The arm piece 72 is connected to the slide shaft 13 through the swingable piece 52. Similarly, an arm piece 73 extends from the outer valve 62 in the radial direction penetrating the housing 63. The arm piece 73 is connected to the piston 22 side of the suspension spring 14 through the lever piece 53. The function of this rotary valve 60 is substantially same as the rotary valve 26 described. Although the inner valves 36 and 61 are connected to the feed pipe 31 and the return pipe 42 and the outer valves 37 and 62 are connected to the cylinder 23 in the rotary valves 26 and 60, the outer valves 37 and 62 side may be connected to the cylinder 23, and the outer valves 37 and 62 side may be connected to the feed pipe 31 and the return pipe 42. These rotary valves 26 and 60 are small in size and simple in construction, and therefore suitable to be disposed near to the suspension spring 14.

Figure 12:
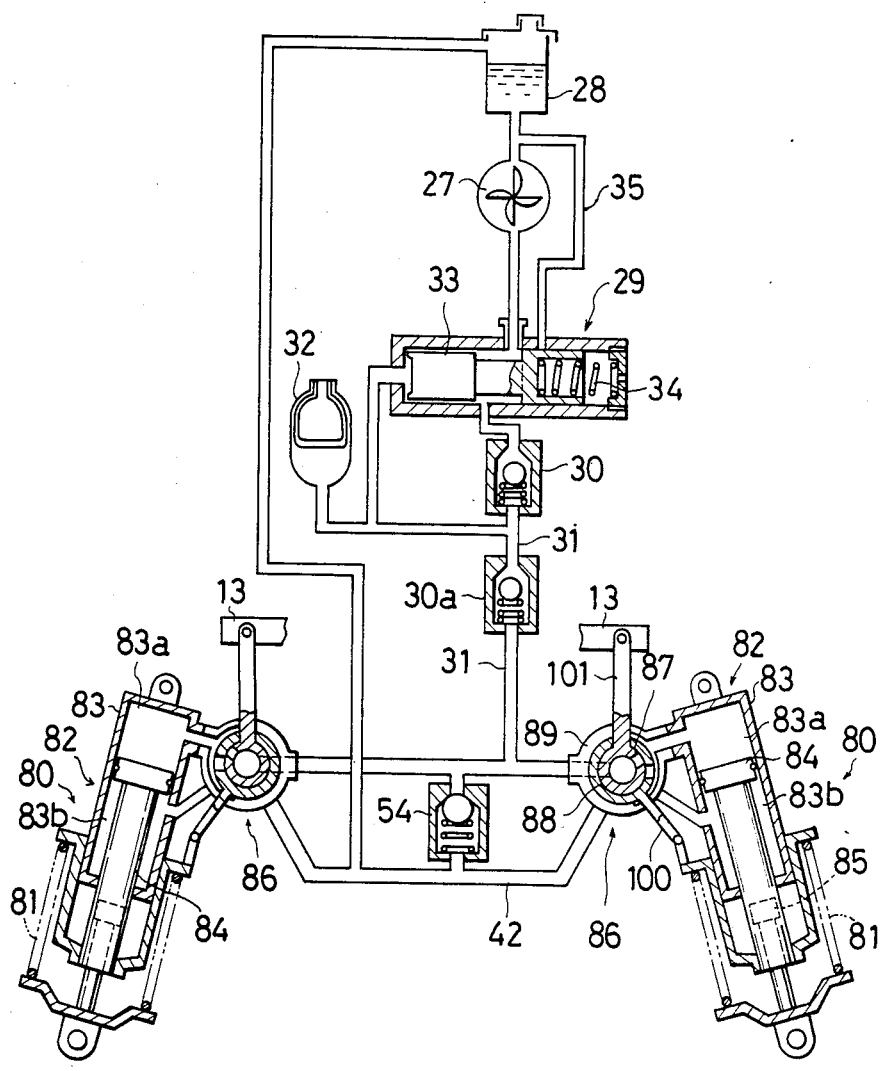
FIG. 12 is an illustration showing a hydraulic circuit as well as a suspension spring when a vehicle runs straight forward according to still another embodiment of the present invention.

FIG. 12 illustrates another embodiment of the present invention. In FIG. 12, only oil pressure circuit and a suspension spring are shown. Since the remaining other parts are generally identical to those of FIGS. 1 and 2, description will be omitted. In FIG. 12, identical parts as those in FIG. 3 are denoted by identical reference numerals and description on them will be omitted, too.

A suspension spring 80 in this embodiment includes, as same as the suspension spring 14 described, a coil spring 81 and a telescopic member 82, and the telescopic member 82 comprises a cylinder 83 and a piston 84. However, in this embodiment, the inside of the cylinder 83 is divided into an upper cylinder chamber 83a and a lower cylinder chamber 83b by the piston 84. As described with reference to FIG. 2, when the vehicle effects a right turn for example, a pressure oil is fed into the upper cylinder chamber 83a of the cylinder 83 of the left side (right side in the figure) suspension spring 80, and an actuation oil is discharged from the lower cylinder chamber 83b. On the other hand, an actuation oil is discharged from the upper cylinder chamber 83a of the right side suspension spring 80, and a pressure oil is fed into the lower cylinder chamber 83b. As a result, the left side cylinder 83 is moved upwardly (i.e., the telescopic member 82 is expanded) by oil pressure acted between the piston 84 and the cylinder 83, and the total length of the left side suspension spring 80 becomes long. On the other hand, the right side suspension spring 80 is shortened in its total length due to downward movement of the cylinder 83, i.e. contraction of the telescopic member 82. The foregoing action is performed rapidly and smoothly, since the actuation oil is simultaneously charged to or discharged from each of the cylinder chambers 83a and 83b opposite with respect to each other with the piston 84 held therebetween. The piston 84 is connected to the lower arm 4 (see FIGS. 1 and 2) through a damper apparatus 85.

Figure 13:
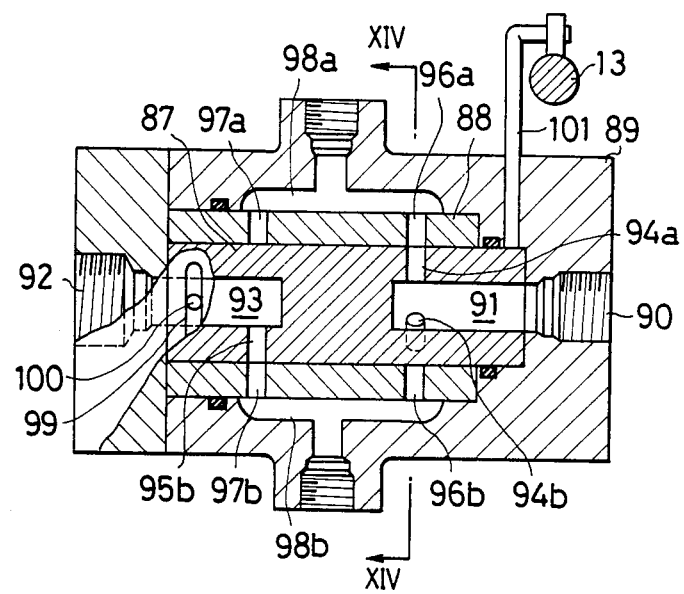
FIG. 13 is a vertical sectional view of the control valve when the suspension spring is expanded.
Figure 14:
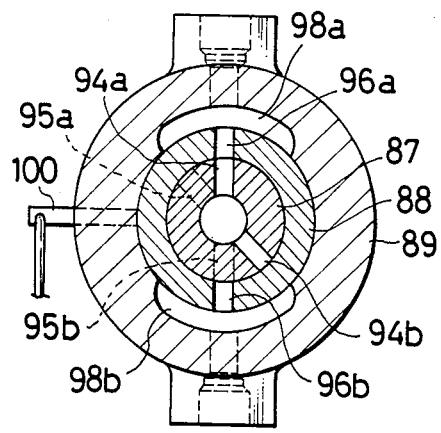
FIG. 14 is a sectional view taken on line XIV-XIV of FIG. 13.
Figure 15:
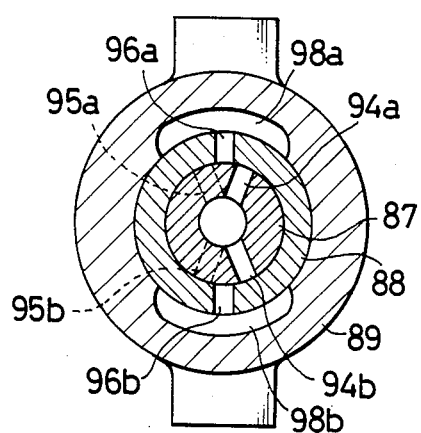
FIGS. 15 and 16 are sectional views similar to FIG. 14 showing the control valve when a vehicle runs straight forward and the suspension spring is contracted, respectively.
Figure 16:
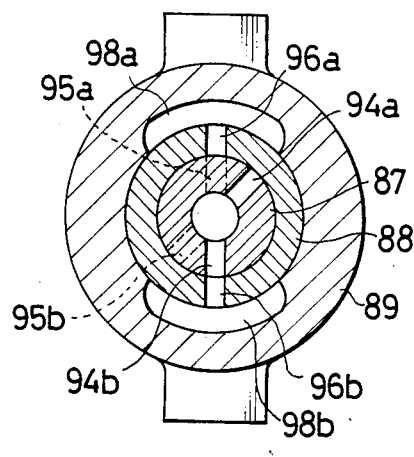

The rotary valve 86, as shown in FIGS. 13 through 16, comprises a column-shaped inner valve 87, a cylinder-shaped outer valve 88 contacted to the outer peripheral surface of the inner valve 87 and relatively pivotably fitted, and a main body 89 for pivotably accommodating and supporting them. The inner valve 87 is provided with an oil feed path 91 communicating with the feed pipe 31 through the inlet port 90, and an oil discharge path 93 communicated with the return pipe 42 through an outlet port 92. And, these oil feed path 91 and oil discharge path 93 are disposed along the central axis of the inner valve 87, and opened up in both end surfaces of the inner valve 87, respectively. The inner valve 87 is provided with two oil feed ports 94a and 94b extending from the oil feed path 91 in the radial direction in the same cross sectional plane and opened up in the outer peripheral surface thereof. The oil discharge path 93 side is also provided with similar oil discharge ports 95a and 95b. These oil feed and oil discharge ports, as shown in FIGS. 14 through 16, are arranged as such that an angle formed by the oil feed port 94a and the oil discharge port 95a will be equal to an angle formed by the oil feed port 94b and the oil discharge port 95b.

The outer valve 88 is provided with oil feed holes 96a and 96b which can be respectively connected to the oil feed ports 94a and 94b, and oil discharge holes 97a and 97b which can be respectively connected to the oil discharge ports 95a and 95b. These holes are disposed in such an angular relation as that the oil discharge hole 97b communicates with the oil discharge port 95b when the oil feed hole 96a communicates with the oil feed port 94a for example. The main body 89 is provided with an oil path 98a for intercommunicating the oil feed and oil discharge holes 96a and 97b, and an oil path 98b for intercommunicating the oil feed and oil discharge holes 96b and 97b. The oil path 98a is connected to the upper cylinder chamber 83a of the cylinder 83, while the oil path 98b is connected to the lower cylinder chamber 83b of the cylinder 83 (see FIG. 12).

As shown in FIGS. 12 through 14, the outer valve 88 is connected to the piston 84 side of the telescopic member 82 through a lever piece 100 which extends penetrating a peripheral grooves formed in the main body 89 and pivoted in response to relative movement of the piston 84. The inner valve 87 is connected to the slide shaft 13 through a similar lever piece 101 and pivoted in response to movement, i.e. steering operation, of the steering shaft 13.

When the vehicle runs straight forward, the rotary valve 86 is in its neutral position as shown in FIG. 15, and the oil feed and oil discharge holes 96 and 97 are in intermediate position between the oil feed port 94 and the oil discharge port 95, and communicated with neither one of them. From this state, when the inner valve 87 is pivoted, for example, counter clockwise through the slide shaft 13 and the lever piece 101 in response to the steering operation, the oil feed hole 96a is brought to be in conformity with the oil feed port 94a, and at the sme time, the oil discharge hole 97b is brought to be in conformity with the oil discharge port 95b as shown in FIGS. 13 and 14. As the result, the upper cylinder chamber 83a of the cylinder 83 is communicated with the feed pipe 31 through the oil path 98a, oil feed hole 96a, oil feed port 94a, oil feed path 91 and inlet port 90, while the lower cylinder chamber 83b is communicated with the return pipe 42 through the oil path 98b, oil discharge hole 97b, oil discharge port 95b, oil discharge path 93 and outlet port 92. And, the telescopic member 82 comprising the cylinder 83 and the piston 84 expands. At this time, in response to the relative movement of the piston 84, the outer valve 88 is pivoted counter clockwise through the lever piece 100 to effect feed-back action. Due to the foregoing, the suspension spring 80 is expanded to a length corresponding to the steering quantity. On the other hand, in the other side rotary valve 86, the inner valve 87 is pivoted clockwise in FIG. 15, and, as shown in FIG. 16, the oil feed port 94b is brought to be in conformity with the oil feed hole 96b, while the oil discharge port 95a is brought to be in conformity with the oil discharge hole 97a. As the result, the upper cylinder chamber 83 of the cylinder 83 is communicated with the return pipe 42 and at the same time, the lower cylinder chamber 83b is communicated with the feed pipe 31, and the suspension spring 80 is shortened by a length corresponding to the steering quantity.

In this way, as described with reference to FIG. 2, the vehicle effects a turn by declining the vehicle body 2 toward the turning center side. The vehicle body 2 is promptly and smoothly inclined according to the steering operation by feeding the actuation oil to one of the cylinder chambers 83a and 83b of the telescopic member 82 and discharging the actuation oil from another cylinder chamber at the same time.

Figure 17:
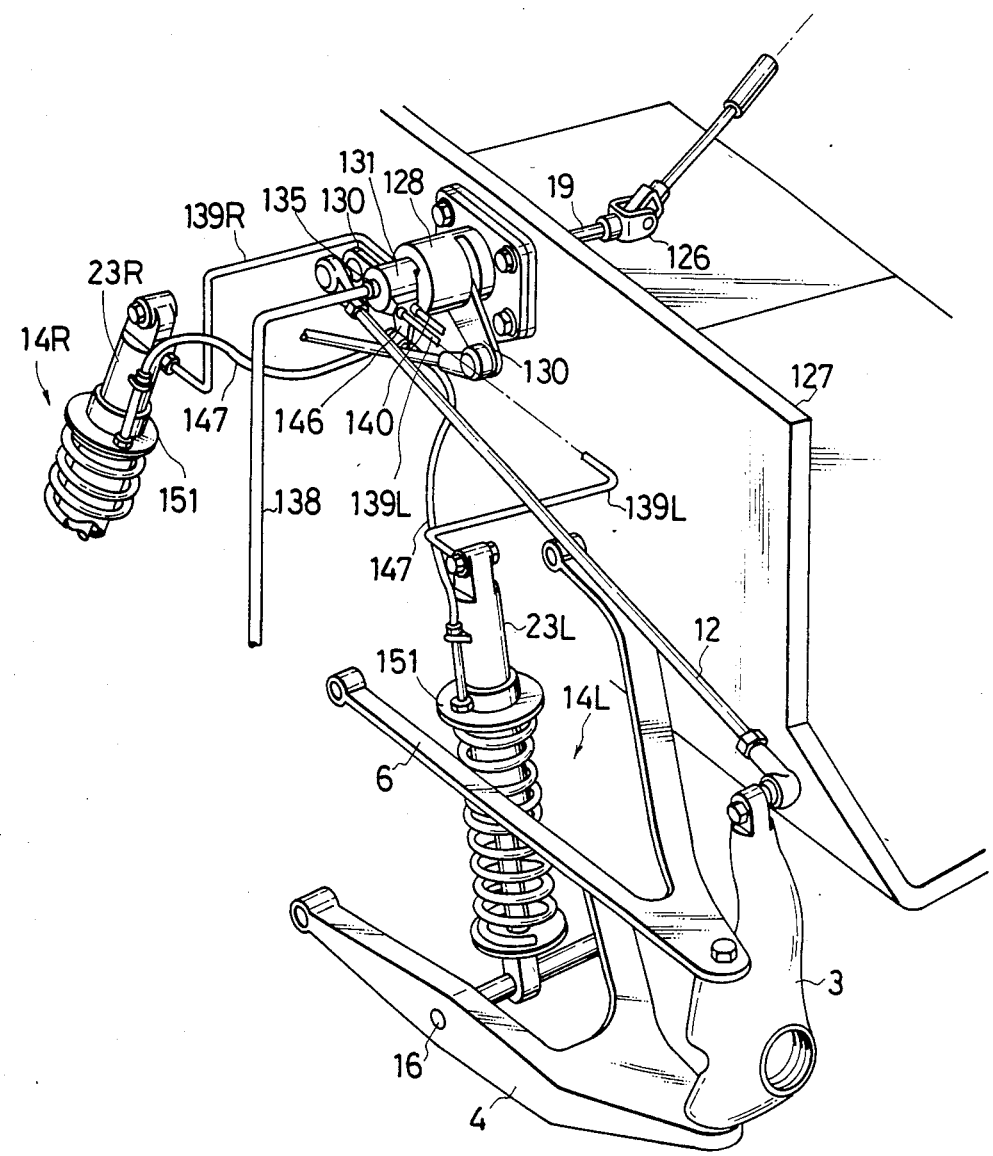
FIG. 17 is a perspective view showing still another embodiment of the present invention.
Figure 18:
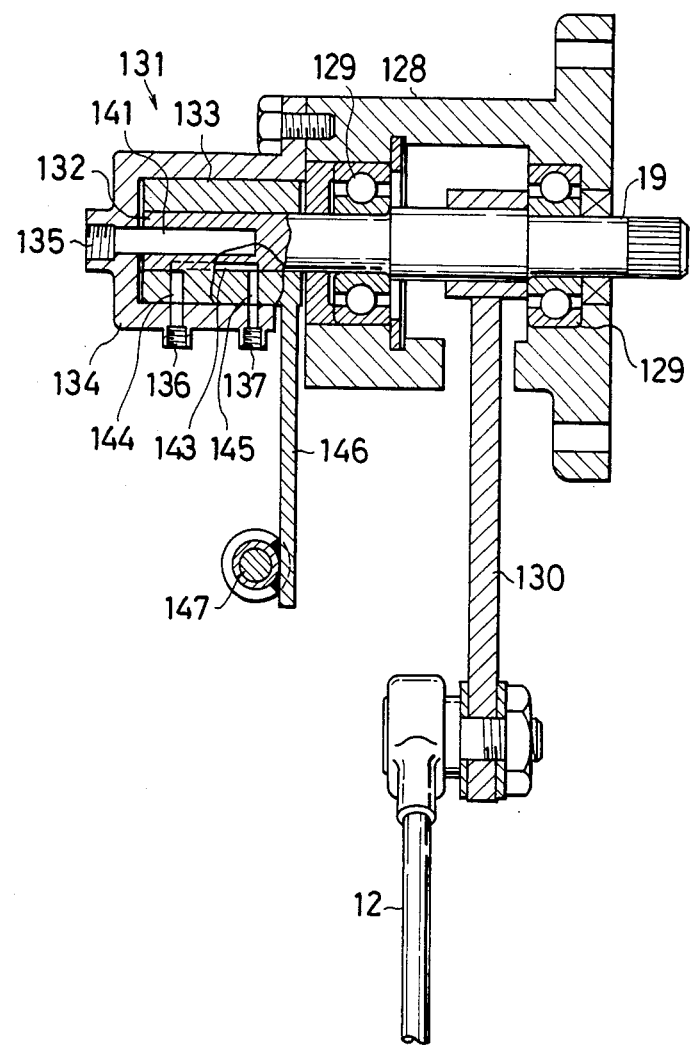
FIG. 18 is a vertical sectional view of a fluid switching apparatus in the above embodiment.

FIG. 17 illustrates still another embodiment of the present invention. In FIG. 17, there is shown a main portion of a steering system and an oil pressure system for effecting an inclining action of the vehicle body 2. The other remaining portions are generally identical with those in FIGS. 1 and 2. Accordingly, similar parts as those shown in FIGS. 1 and 2 are denoted by similar reference numerals, and detailed description thereof will be omitted. In this embodiment, the steering shaft 19 is connected to the steering wheel 20 through a universal joint 126. The steering shaft 19 extends into the inside of a box 128 fixed to a partition wall 127 formed at the vehicle body 2 by penetrating the partition wall 127, and pivotably supported by bearings 129 as shown in FIG. 18. Instead of being interconnected through the pinion 18, rack 17 and slide shaft 13 as shown in FIGS. 1 and 2, the steering shaft 19 and the tie rod 12 are interconnected like a link system through a steering arm 130 fixed to the steering shaft 19. Of course, a connecting by means of a pinion and rack may be employed. Otherwise, the tie rod 12 may be moved by the steering shaft 19 through a cam.

One end portion of the box 128 is mounted with a fluid switching apparatus or rotary valve 131 as shown in FIG. 18. The rotary valve 131 includes two rotary valve bodies, i.e. an inner valve 132 and an outer valve 133 mutually pivotably fitted together. The inner valve 132 is formed of an extended portion of the steering shaft 19. A valve main body 134 for accommodating the inner valve 132 and the outer valve 133 is provided with one oil inlet port 135, two right and left oil outlet ports 136L and 136R, and one oil discharge port 137. As shown in FIG. 17, the oil inlet port 135 is connected to a hydraulic pump (not shown) through an oil feed pipe 138. The oil outlet ports 136L and 136R respectively are communicated with the cylinders 23L and 23R of the left and right suspension apparatuses 14L and 14R through a connecting pipes 139L and 139R. And, the oil discharge port 137 is communicated with a reservoir tank (not shown) through a return pipe 140. An actuation oil is fed to either one of the cylinders 23 from the oil feed pipe 138 according to pivot position of the inner valve 132 or steering shaft 19 and returned to the reservoir tank from the other cylinder 23 through the return pipe 140.

Figure 19:
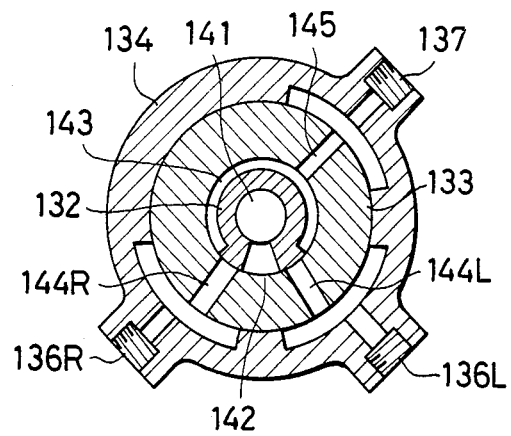
FIGS. 19 and 20 are cross sectional views of the above fluid switching apparatus.

That is, as apparent from FIGS. 18 and 19 (in FIG. 19, the position of the oil discharge port 137 is anglewise displaced and moved into a same sectional plane of the oil outlet port 136 for better understanding), the inner valve 132 is provided with an oil feed path 141 extending in the axial direction and communicating with the oil inlet port 135, a feed port 142 opened up in the outer peripheral surface of the inner valve 132 extending in the radial direction from the oil feed path 141, and a discharge path 143 disposed along the outer peripheral surface of the inner valve 132 separated from the feed port 142. On the other hand, the outer valve 133 is provided with a connecting port 144L normally communicating with the oil outlet port 136L, a connecting port 144R normally communicating with the oil outlet port 136R, and a discharge outlet port 145 normally communicating with the oil discharge port 137 and the discharge path 143.

Figure 21:
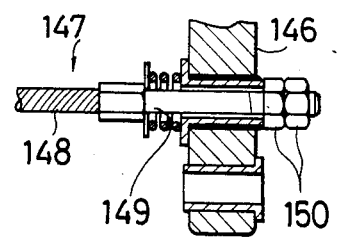
FIG. 21 is a sectional view showing a connecting portion between a cable and a lever piece.

The outer valve 133 is provided with a lever piece 146 extending in the radial direction by penetrating the valve main body 134. The lever piece 146 is attached with one end of a pull member or cable 147. The cable 147, as shown in FIG. 21, is formed of a sleeve 148 and a core wire 149 thrusted therethrough. One end portion of the core wire 149 is secured to the lever piece 146 by a bolt 150. The other end of the core wire 149 is firmly secured to a spring holding piece 151 of the suspension spring 14 as shown in FIG. 17. The spring holding piece 151 is firmly secured to the piston 22 (see FIG. 1) of the telescopic member 24. Accordingly, when the telescopic member 24 is expanded, the iron core 149 is acted with a tensile force, and due to the tensile force, the outer valve 133 is pivoted through the lever piece 146.

While the vehicle runs straight forward, the rotary valve 131 is located in a neutral position shown in FIG. 19. From this state, when the steering wheel 20 is pivoted to the direction as shown by an arrow a as described with reference to FIG. 2 in order to effect a right turn for example, the inner valve 132 is pivoted counter clockwise in FIG. 19. As a result, the feed port 142 and the connecting port 144L are brought to be in conformity with each other, and the connecting port 144R communicates with the discharge path 143. Accordingly, the actuation oil fed therein through the oil feed pipe 138 is fed to the left side suspension spring 14L. As a result, the suspension spring 14L is expanded. While the actuation oil of the right side suspension spring 14R escapes to the reservoir tank through the return pipe 140. As a result, the suspension spring 14R is contracted. Due to the foregoing, the vehicle body 2 is inclined toward the right or turning center side as shown in FIG. 2.

Figure 20:
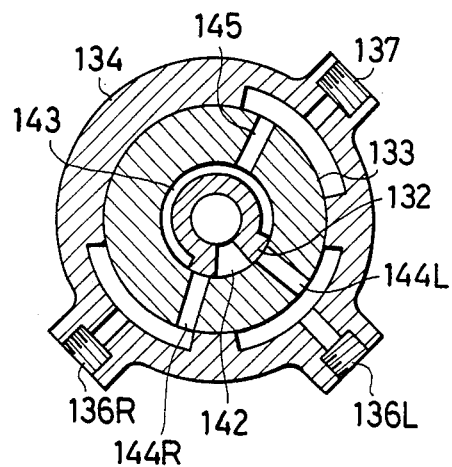

When the left side suspension apparatus 14L is expanded, the cable 147 connected thereto is tensioned to pivot the outer valve 133 counter clockwise as same as the inner valve 132 through the lever piece 146. Accordingly, the conforming relation between the feed port 142 and the connecting port 144L is maintained, and the suspension spring 14L is kept expanding during the pivoting of the inner valve 132. When the inner valve 132 stops pivoting and the connecting port 144L is brought to be in a state as shown in FIG. 20 after passing the feed port 142, the feeding of the actuation oil to the suspension spring 14L is cut off. Accordingly, the vehicle body 2 is no more inclined further and a turn is effected while maintaining a vehicle body inclining angle corresponding to the steering quantity. According to this embodiment, the vehicle body can be inclined toward the turning center side by a comparatively simple apparatus having only one rotary valve 131, when the vehicle effects a turn.

What is claimed is:

1. A suspension apparatus of a vehicle disposed between a pair of right and left vehicle wheels and a vehicle body comprising:
   a suspension spring which is expanded and contracted by feeding fluid thereto and discharging the fluid therefrom;

a control valve comprising a rotary valve attached to said suspension spring and adapted to control the feeding and the discharging of the fluid; and a swingable piece pivotally attached at one end to a steering member reciprocally movable in the right and left direction and at the other end to a valve body of said control valve, so that the swingable piece is swung according to reciprocal movement of said steering member to rotate said valve body; the pivot axis of said swingable piece with respect to said steering member being disposed on a generally extension of the pivot axis of said suspension spring with respect to the vehicle body.

2. A suspension apparatus according to claim 1, wherein said control valve comprises an inner and an outer valve bodies formed of rotary bodies relatively rotatably and intimately fitted together about a same axis, and a housing enclosing these valve bodies therein, and relatively rotatably and intimately contacted to the outer peripheral surface of the outer valve body, both of said valve bodies each being provided with a feed port and a discharge port opened up in a contacting surface of each of said valve bodies in such a manner as that a rotary position where said feed ports of both the valve bodies are brought to be in conformity with respect to each other is different from a rotary position where said discharge ports of both the valve bodies are brought to be in conformity with respect to each other.

3. A vehicle body inclining apparatus including a pair of suspension spring respectively disposed between a pair of right and left vehicle wheels and a vehicle body and which is expanded and contracted according to the feeding and the discharging of fluid, and a fluid switching apparatus adapted to feed the fluid to one of said suspension springs and discharge the fluid from the other suspension spring in response to a steering member; said fluid switching apparatus comprising a first rotary valve which is rotated in association with said steering member, and a second rotary valve mutually rotatably fitted to said first rotary valve, said first rotary valve being provided with a feed port communicating with a fluid source and a fluid discharge path, said second rotary valve being provided with a pair of right and left connecting ports selectively communicating with said feed port or fluid discharge path due to relative rotation between said first rotary valve and the second rotary valve, said connecting ports being connected to said respective suspension springs, a pull member being disposed between said second rotary valve and said suspension springs and adapted to rotate said second rotary valve by tensile force produced when said suspension springs are expanded.

* * * * *